(12) United States Patent
Li et al.

(10) Patent No.: US 12,442,991 B2
(45) Date of Patent: Oct. 14, 2025

(54) DUAL LENS OPTICAL COUPLING TO MULTICORE FIBER

(71) Applicant: Cisco Technology, Inc., San Jose, CA (US)

(72) Inventors: Weizhuo Li, Berkeley Heights, NJ (US); Norbert Schlepple, Macungie, PA (US); Jock T. Bovington, Koenigstein Im Taunus (DE)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 18/163,806

(22) Filed: Feb. 2, 2023

(65) Prior Publication Data
US 2024/0264387 A1    Aug. 8, 2024

(51) Int. Cl.
    *G02B 6/42*      (2006.01)

(52) U.S. Cl.
    CPC ......... *G02B 6/4207* (2013.01); *G02B 6/4216* (2013.01); *G02B 6/4227* (2013.01)

(58) Field of Classification Search
None
See application file for complete search history.

(56) References Cited

U.S. PATENT DOCUMENTS

| | | | | | |
|---|---|---|---|---|---|
| 11,199,668 | B1* | 12/2021 | Schlepple | .......... | G02B 6/02042 |
| 11,662,532 | B2* | 5/2023 | Schlepple | ............ | G02B 6/4206 |
| | | | | | 385/33 |
| 2003/0174937 | A1* | 9/2003 | Huang | ................. | G02B 6/2937 |
| | | | | | 385/47 |
| 2003/0179993 | A1* | 9/2003 | Shigenaga | ........... | G02B 6/3885 |
| | | | | | 385/33 |
| 2012/0251045 | A1 | 10/2012 | Budd et al. | | |
| 2015/0168642 | A1* | 6/2015 | Mimura | ............ | H01S 3/094007 |
| | | | | | 385/33 |
| 2017/0322381 | A1 | 11/2017 | Saeki et al. | | |
| 2022/0120974 | A1 | 4/2022 | Schlepple et al. | | |

OTHER PUBLICATIONS

J. Kunde et al., "Novel Releasable Multi-Fiber Optical Connectivity Solution for Optical Communication using V-Grooves and Micro-Lens Arrays," 2006 1st Electronic Systemintegration Technology Conference, Dresden, Germany, 2006, pp. 268-273, doi: 10.1109/ESTC.2006.280009. [Abstract Only].

* cited by examiner

*Primary Examiner* — Jerry Rahll
(74) *Attorney, Agent, or Firm* — Patterson + Sheridan, LLP

(57) ABSTRACT

The optical devices described herein include a lens arrangement for coupling light between light sources and optical fibers with a reduced size compared to the use of optical waveguides, while also allowing for the use of power sensitive optical components, such as components with lower power density configurations. The lens arrangements include a collimating lens, a focusing lens, and at least one optical component positioned between the collimating lens and the focusing lens.

17 Claims, 11 Drawing Sheets

DUAL LENS OPTICAL COUPLING TO MULTICORE FIBER

TECHNICAL FIELD

Embodiments presented in this disclosure generally relate to optical devices. More specifically, embodiments disclosed herein relate to coupling one or more multi-channel lasers devices to a multicore fiber using a plurality of lens and optical components.

BACKGROUND

As optical devices and optical communication networks increase in size and performance, the size and number of the optical components also increases. For example, an optical device may have multiple optical components and optical connections connected to the optical device. In order to reduce the footprint or size of each of the various optical components, multi-channel devices and multicore fibers (MCFs) are increasingly used to meet the increased optical capacity without causing large increases in optical device size.

Multicore fibers can significantly reduce a fiber count within the packaging, and in some cases may have a same outer diameter as single-mode optical fibers. However, solutions for coupling optical signals from a multi-channel device with optical cores of the multicore remains challenging, and may increase the material and/ fabrication costs of the optical devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
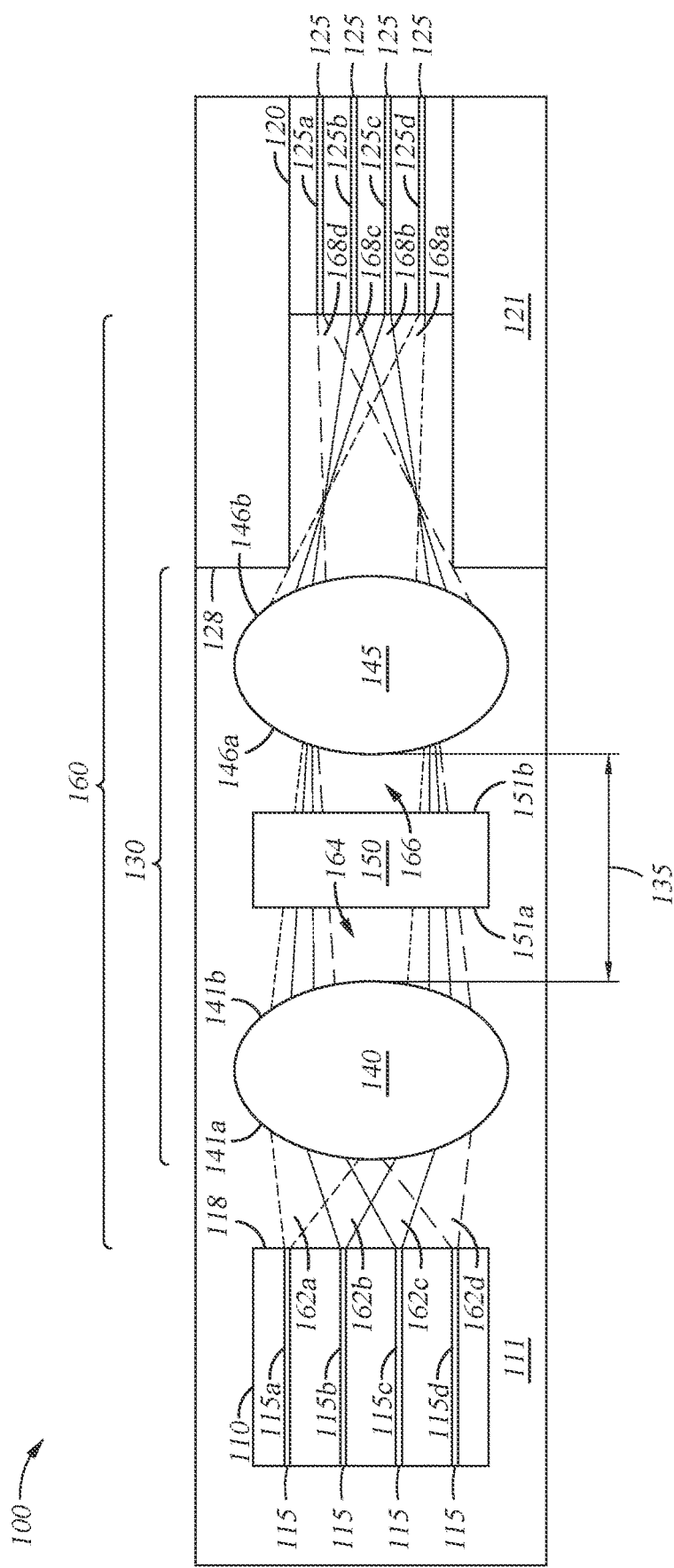
FIG. 1 illustrates an optical device with a multicore optical fiber optically coupled to a multi-channel laser die, according to one or more embodiments.

One example embodiment includes an optical device. The optical device includes a first multi-channel laser die, where the first multi-channel laser die includes a first plurality of laser channels at a first front facet of the first multi-channel laser die. The optical device also includes a lens arrangement, where the lens arrangement includes a first collimating lens aligned to the first front facet, a focusing lens, and at least one optical component positioned between the first collimating lens and the focusing lens. The optical device also includes a multicore optical fiber aligned to the first multi-channel laser die through the lens arrangement, where the multicore optical fiber includes a first plurality of optical cores.

Another example embodiment includes a method. The method includes positioning a first multi-channel laser die on a base structure for an optical device, where the first multi-channel laser die may include a first plurality of laser channels at a first front facet of the first multi-channel laser die, and aligning a first collimating lens to the first front facet, where a first side of the first collimating lens faces the first front facet. The method also includes positioning at least one optical component on a second side of the first collimating lens opposite the first side of the first collimating lens and positioning a focusing lens on the base structure to place the at least one optical component between the first collimating lens and the focusing lens. The method also includes aligning a multicore optical fiber to the first multi-channel laser die through the first multi-channel laser die and through the focusing lens, the at least one optical component, and the first collimating lens.

One example embodiment includes an optical coupling system. The optical coupling system includes a collimating lens aligned to a front facet of a multi-channel laser die, where plurality of optical signals received from the front facet are collimated into a plurality of collimated beams by the collimating lens. The system also includes at least one optical component positioned to receive the plurality of collimated beams and apply at least one optical function to the collimated beams. The system also includes a focusing lens positioned to receive the plurality of collimated beams passing through the at least one optical component, where the focusing lens couples the collimated beams into a plurality of optical cores in a multicore optical fiber.

Example Embodiments

As optical communication networks and other optical based technologies develop, more optical devices and components are able to be arranged on a shared structure. For example, multiple lasers, including multiple laser dies, may be placed on a single base structure or substrate. The increase of devices in this shared structure reduces production costs and may increase efficiency of the devices and related networks due to the proximity of the devices to the other devices.

However, the increased density of optical devices on an optical structure presents challenges for connecting the optical signals to and from the optical devices to optical pathways. For example, routing an optical signal from a source (e.g., a laser device) to an optical fiber presents spacing challenges since individual pathways for the optical signals via optical waveguides often increases device size as well as related resource costs for the optical devices.

Some example solutions to this challenge include utilizing a single lens to provide a coupling path between a light source (e.g., a laser die) and an optical fiber. The use of a single lens presents an efficient coupling method; however, the focused beams of the light passing through the single lens may present power limitations for the various optical coupling devices. For example, an optical isolator placed between a single lens and an optical fiber may limit a related power from the light source due to power density limitations in the optical isolator.

The optical devices described herein include a lens arrangement for coupling light between light sources and optical fibers with a reduced size compared to the use of optical waveguides, while also allowing for the use of power sensitive optical components, such as components with lower power density configurations. The lens arrangements described herein include a collimating lens, a focusing lens, and at least one optical component positioned between the collimating lens and the focusing lens. An example optical device with a lens arrangement is described in relation to FIG. 1.

FIG. 1 illustrates an optical device 100 with a multicore optical fiber (MCF) 120 optically coupled to a multi-channel laser die 110, according to one or more embodiments. In some examples, the optical device is an optical coupling system and includes a base structure 111 for the various optical components that form the optical device 100. For example, the laser die 110 is positioned on the base structure 111 as a laser or light source for optical signals of the optical device 100. A lens arrangement 130 for coupling the optical signals from the laser die 110 to the MCF 120 is also positioned on the base structure 111. For example, the lens arrangement 130 provides a coupling path between the laser die 110 and the MCF 120 for optical signals 160 transmitted between the laser die 110 and the MCF 120.

Figure 3A:
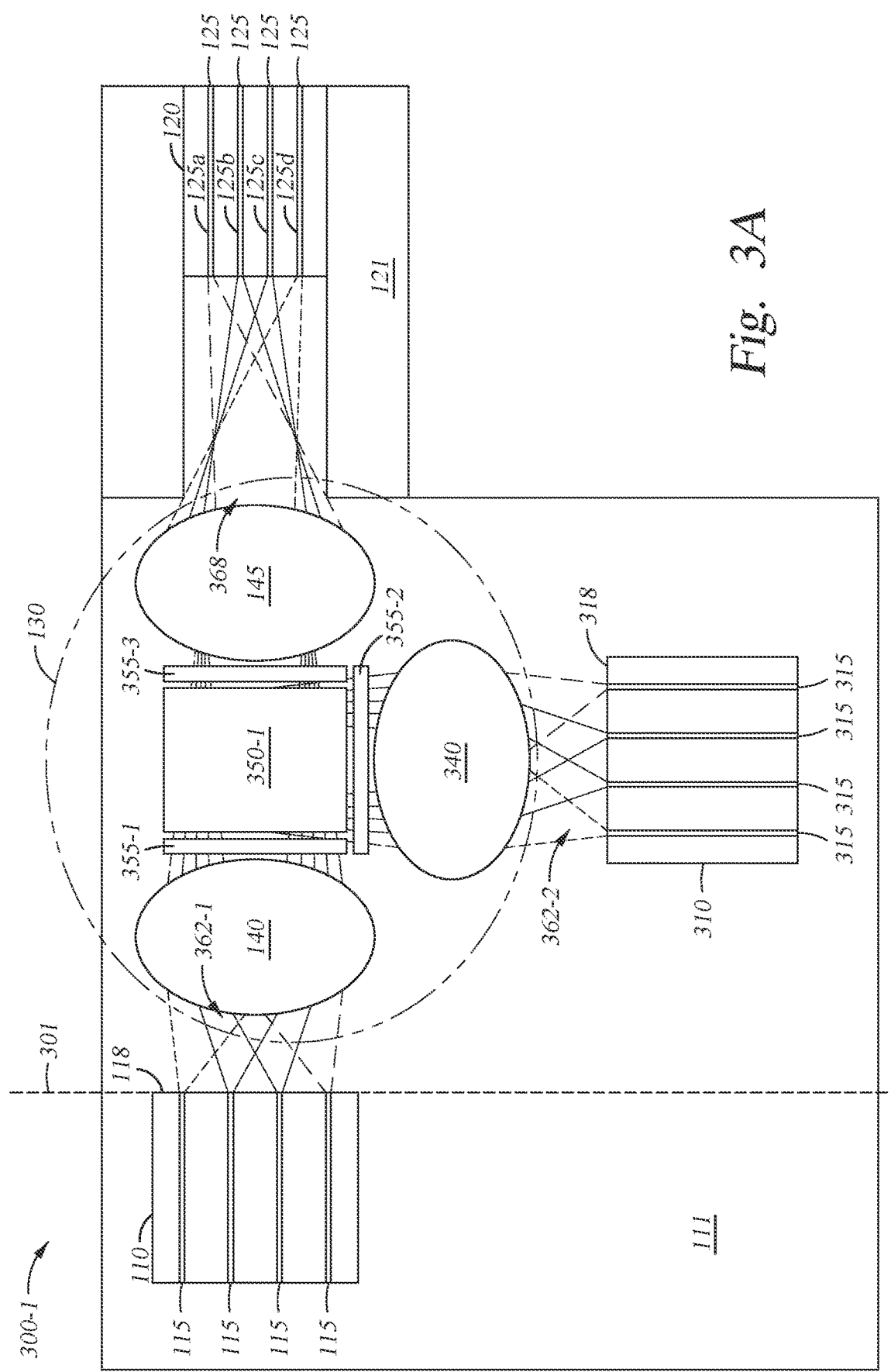
FIGS. 3A and 3B illustrate optical devices with multiple multi-channel laser dies, according various embodiments.
Figure 3B:
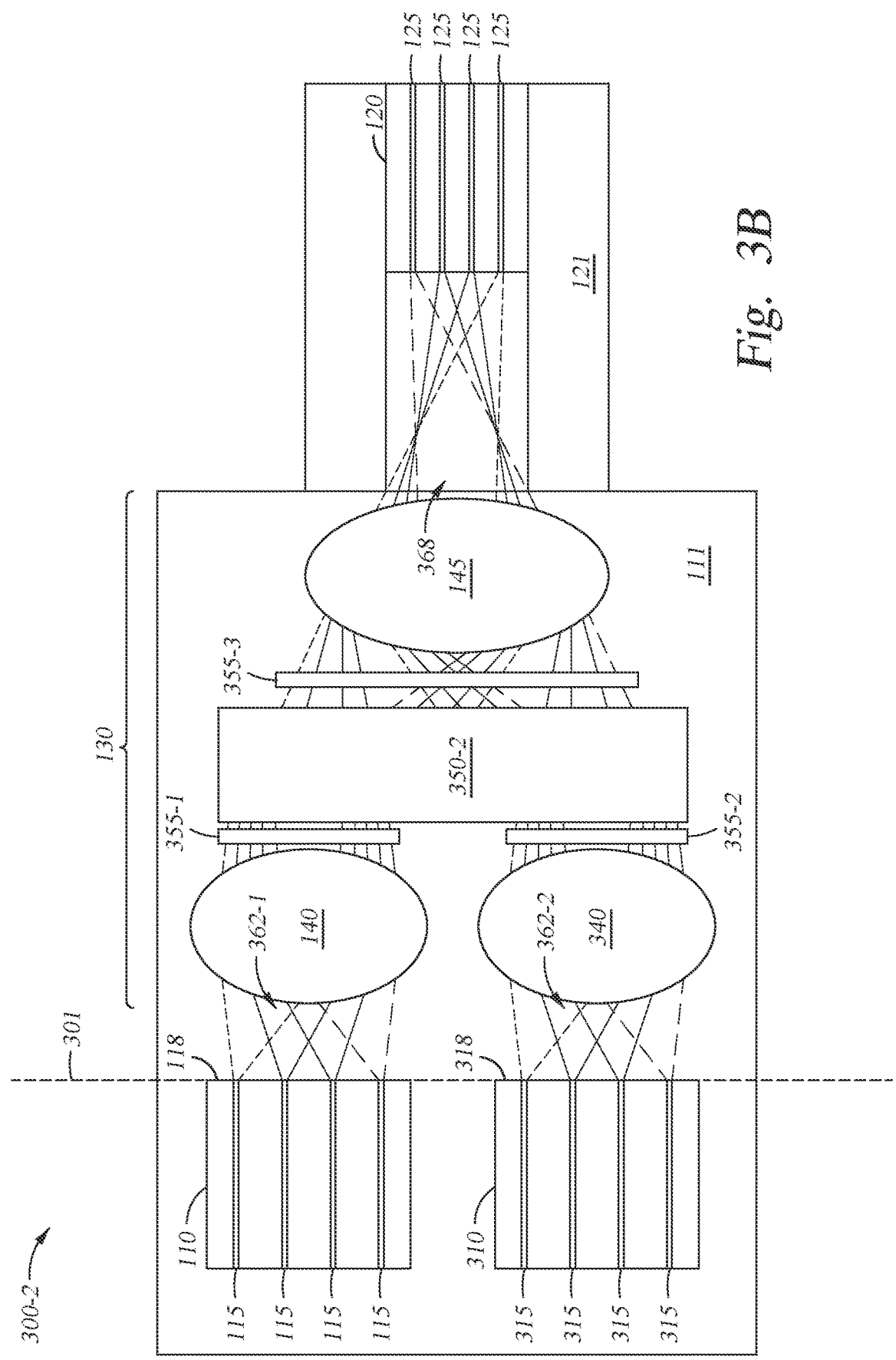

In some examples, the base structure 111 is a substrate which may be formed of any suitable material, such as silicon or ceramic. In some embodiments, the laser die 110 is a laser formed via epitaxially growing III-V material layers on the substrate. In another example, the laser die 110 may be an independent device attached to the substrate. The optical device 100 may include additional devices attached to or formed on the base structure 111. For example, as shown in FIGS. 3A and 3B, the laser die 110 may be one multi-channel laser die (or other light source) of a plurality of laser dies (light sources) positioned on the base structure 111.

The laser die 110 includes a plurality of optical channels such as multi-channels 115 which includes channels 115a, 115b, 115c, and 115d. Each of the channels 115a-115d generates and delivers optical energy/signals from a laser source in the laser die 110 to a facet end 118 (e.g., a front facet) of the laser die 110. The optical signals delivered by the multi-channels 115 may have the same or differing wavelengths. For example, an optical signal emitted from the channel 115a may have a wavelength of 1271 nanometers (nm) and the channel 115b may emit an optical signal with a wavelength of 1331 nm.

In some examples, the multi-channels 115 are arranged in a planar arrangement proximate to the facet end 118 of the laser die 110. The facet end 118 of the laser die 110 may be formed using any suitable techniques, such as etching, mechanical sawing, surface grinding, and so forth to form a surface for optical energy to emit from the multi-channels 115 and facet ends 118. In one example, the multi-channels 115 are formed as optical waveguides that extend to the facet end 118 (e.g., terminate at the facet end 118). In another example, the optical waveguides extend close to the facet end 118 (e.g., within a few microns), such that optical energy exiting the optical waveguides propagates partly through another semiconductor material (e.g., silicon) to exit the facet end 118.

As described above, the optical device 100 also includes the lens arrangement 130 positioned between the laser die 110 and the MCF 120 to couple the light generated at the laser die 110 to the MCF 120. The lens arrangement 130 provides a path for optical signals 160 between the laser die 110 and the MCF 120. As shown in FIG. 1, the lens arrangement 130 includes at least two lens components. For example, the lens arrangement 130 includes a collimating lens 140 and a focusing lens 145. The lens arrangement 130 also includes at least one optical component, such as optical component 150, positioned between the collimating lens 140 and the focusing lens 145. While shown in FIG. 1 as including a single collimating lens and single optical component, the lens arrangement 130 may include multiple optical components and multiple collimating lenses as described in more detail in relation to FIGS. 2A-2B and FIGS. 3A-3B.

In some examples, the optical signals 160 are altered or changed at each of the components of the lens arrangement 130. For example, channel 115a emits an optical signal 162a, channel 115b emits an optical signal 162b, channel 115c emits optical signal 162c, and channel 115d emits optical signal 162d (referred to collectively as optical signals 162). The optical signals 162 emit from the facet end 118 at a given power. In some examples, the power of the optical signals 162 may be limited due to free space optical devices used to couple light into optical fibers. For example, an optical isolator is often placed between a laser die (or light source) and an optical fiber to prevent optical feedback from the fiber entering the laser die. Optical power density of optical signals passing through isolators is often limited due to heat generation within the isolator. For example, an isolator positioned between the focusing lens 145 and the MCF 120 (example not shown in FIG. 1), as is typical in single lens embodiments, limits the power of the optical signals 162 due to the increased power density of the optical beams between the focusing lens and corresponding MCF.

To provide for higher power from the laser die 110 without exceeding power density limitations of free space optical components in the optical device 100, the lens arrangement 130 includes the collimating lens 140. The collimating lens 140 is actively aligned to receive the optical signals 162a-162d at a first side 141a of the collimating lens 140 and collimate the optical signals 162a-162d into collimated signals 164 as the optical signals pass through the collimating lens 140. The collimated signals 164 have a lower power density compared to signals between the focusing lens 145 and the MCF 120. The lower power density allows for the use of the lower powered free space optical components in the optical device 100. While described herein as a collimating lens, other embodiments may include any type of lens or optical component that provides direction to the optical signals 162 and provides the directed optical signals at a low or non-focused power density. The collimated signals 164 exit the collimating lens 140 via a second side 141b and the collimated signals 164 continue propagating towards the at least one optical component, such as optical component 150.

The optical component 150 is positioned between the collimating lens 140 and the focusing lens 145 to apply at least one optical function to the collimated signals 164. While shown in FIG. 1 as a single component, the optical component 150 may include multiple free space optical components arranged together or spaced apart between the collimating lens 140 and the focusing lens 145 along a distance 135. For example, the optical component 150 may include a single free space optical component or multiple free space optical components arranged in various orders and configurations. Various arrangements of multiple free space optical components and functions provided by the components are described in more detail in relation to FIGS. 2A-2B and 3A-3B herein. The collimated signals 164 pass through a first side 151a of the optical component 150 and exit via side 151b as altered collimated signals 166.

The collimated signals 166 propagate from the optical component 150 and towards a first side 146a of the focusing lens 145. The focusing lens 145 is aligned to the MCF 120 to couple the collimated signals 166 into cores of the MCF 120 from a second side 146b of the focusing lens 145. The focusing lens may include any type of lens or optical device that receives the collimated signals 166 and transforms and/or directs the collimated signals 166 into cores of the MCF 120 at an end face 128 of the MCF 120. For example, the MCF 120 includes multi-cores 125 including core 125a, core 125b, core 125c, and core 125d. In some examples, the collimated signals 166 are focused into optical signals 168a, 168b, 168c, and 168d, where the optical signal 168a is directed/coupled into the core 125d, the optical signal 168b is directed/coupled into the core 125c, the optical signal 168c is directed/coupled into the core 125b, the optical signal 168d is directed/coupled into the core 125a.

The MCF 120 may be rigidly attached to the base structure 111 and rotationally aligned (e.g., using an adhesive or welding process) to provide efficient optical coupling between the laser die 110, the lens arrangement 130, and the MCF 120. For example, MCF 120 is rotationally aligned with the laser die 110, the channel 115a provides the optical signal 162a to the core 125d (via the lens arrangement 130 and as optical signal 168a), the channel 115b provides the optical signal 162b to the core 125c, etc.

In some examples, the MCF 120 includes fiber cores in a single plane (e.g., a 1 dimensional (1D) fiber). In another example, the MCD includes fiber cores in two or more planes (e.g., a 2D fiber). The lens arrangement including the focusing lens 145 may couple optical signals into both 1D fibers and 2D fibers as described in more detail in relation to FIGS. 5A-5B. In some examples, the MCF 120 is a polarization-maintaining optical fiber (PMF), where signals coupled via the lens arrangement 130 are non-polarized signals and where each core of the PMF maintains the linear polarization of optical signals received from the lens arrangement 130. In some examples, the MCF 120 is a standard fiber (i.e., not PMF), where the optical signals received from the lens arrangement 130 have a controller state of polarization (SOP) as described in more detail in relation to FIG. 2B.

In some examples, the MCF is attached to the base structure 111 via an optical connector 121. The optical connector 121 may have any suitable implementation, such as a fiber pigtail or a receptacle. The MCF 120 is rigidly attached to the optical connector 121. In some embodiments, the MCF 120 is inserted into an interior space of the optical connector 121, and retained by the optical connector 121 using any suitable means, such as an adhesive, a friction fit, and so forth. In some examples, translating and/or rotating the optical connector 121 relative to the base structure 111, aligns the MCF 120 to the laser die 110 via the lens arrangement 130 in three spatial dimensions (and rotationally).

Using these the embodiments and components described in FIG. 1, packaging and component density may be increased on optical devices as fewer optical fibers, free space optical components, lenses, and/or laser dies are needed when optically coupling the laser die 110 and the MCF 120. Additionally, material and/or process costs during manufacturing may be reduced as fewer components are used, which also corresponds to fewer optical alignment processes. Examples of various configurations/arrangements of the optical device 100 including various arrangements of laser dies and lens arrangements are described in relation to FIGS. 2A-2B and FIGS. 3A-3B.

Figure 2A:
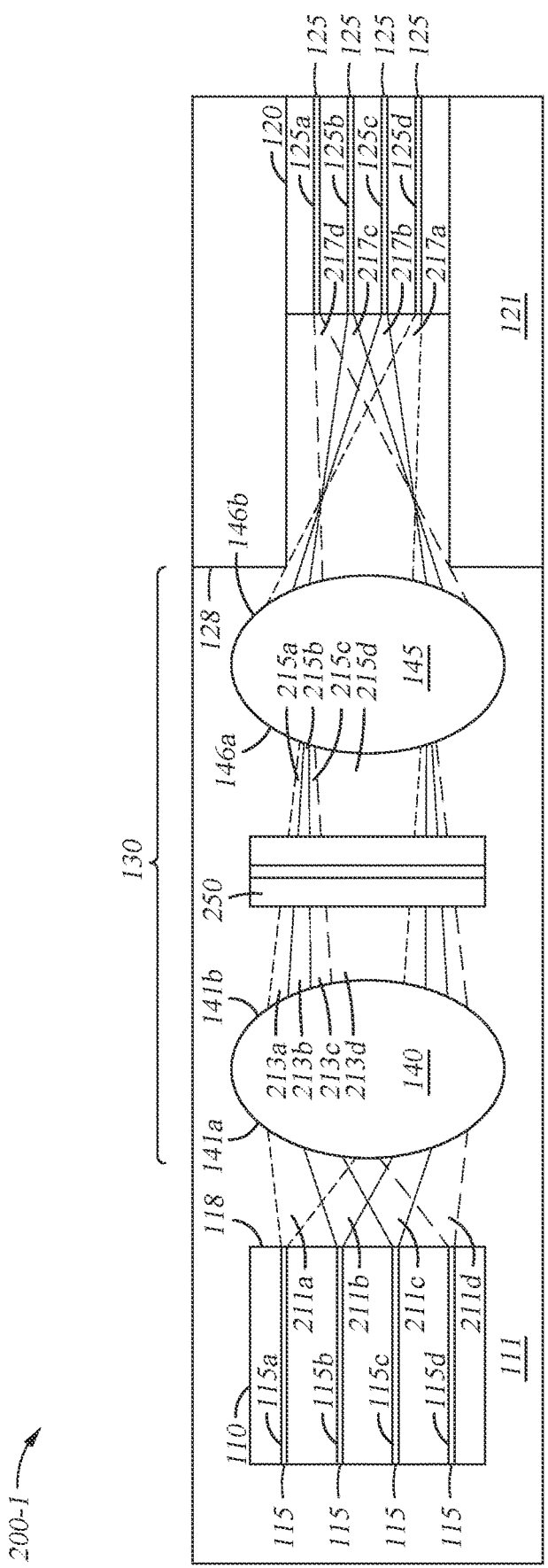
FIG. 2A illustrates an optical device with a power sensitive optical component, according to one or more embodiments.

FIG. 2A illustrates the optical device with a power sensitive optical component, according to one or more embodiments. As described above in FIG. 1, the optical component 150 may include a single free space optical component arranged along the distance 135 between the collimating lens 140 and the focusing lens 145. Arrangement 200-1 of the optical device 100 in FIG. 2A, includes an optical isolator 250 positioned between the collimating lens 140 and the focusing lens 145. In some examples, the optical isolator 250 is dimensioned such that optical signals passing between the first collimating lens and the focusing lens also pass through the optical isolator. For example, optical signals from the laser die 110 include signal 211a emitting from the channel 115a (via the facet end 118), signal 211b emitting from the channel 115b, signal 211c emitting from the channel 115c, and signal 211d emitting from the channel 115d. The signals 211a-211d pass through the collimating lens 140 which collimates the 211a-211d signals into respective collimated signals 213a-213d.

The collimated signals 213a-213d pass into the optical isolator 250 which prevents optical from the MCF 120 and other optical components from interacting with the laser die 110. In some examples, the optical isolator 250 is a power sensitive component. For example, the heat generated inside a garnet of an optical isolator under high optical power may cause damage to the optical isolator 250. For example, some optical isolators have a designed maximum power density up to 0.223 mW/$\mu$m$^2$. In some examples, an optical isolator placed between the focusing lens 145 and the MCF 120 (not shown in FIG. 2A), the small beam diameter of the optical signals results in a high power density. For example, a laser front face power of 100 mW at the facet end 118 results in a peak irradiances of 215 mW/$\mu$m$^2$ at an isolator placed between the focusing lens 145 and the MCF 120. Since the peak irradiance is near the designed power density, in this example the laser die 110 is limited to lower powers around 100 mW or less.

In contrast, the collimated signals 213a-213d and collimated signals 215a-215d have large beam diameters with reduced optical power density. In this example, a laser front face power of 100 mW at the facet end 118 results in a peak irradiances of 0.00317 mW/$\mu$m$^2$ which is significantly less than the designed maximum power density of 0.223 mW/$\mu$m$^2$. The positioning of the optical isolator 250 between the collimating lens 140 and the focusing lens 145 allows for much larger laser power, i.e. greater than 100 mW, from the laser die 110. The arrangement 200-1 provides for the use of the power sensitive optical isolators even as optical communication networks continue to develop and utilize higher powered lasers.

As described above, the MCF 120 may include a PMF or a non-PMF. In the example shown in FIG. 2A, the arrangement 200-2 may include a PM MCF 120 where the PMF preserves the polarization of optical signals 217a-217d coupled into the cores of the MCF 120. In some examples, PMFs may increase the cost of the optical device 100. For example, polarization maintaining MCF are difficult to fabricate and may be difficult to integrate into optical devices. Additionally, cross talk in PM-MCF due to tight pitch of the cores of the MCF may cause degraded optical performance. These limitations may, in turn, limit the application or use of PM-MCF in optical devices. In some examples, in order to provide for alternate fibers (e.g., non-PMF) the lens arrangement includes a polarization controller device as described in relation to FIG. 2B.

Figure 2B:
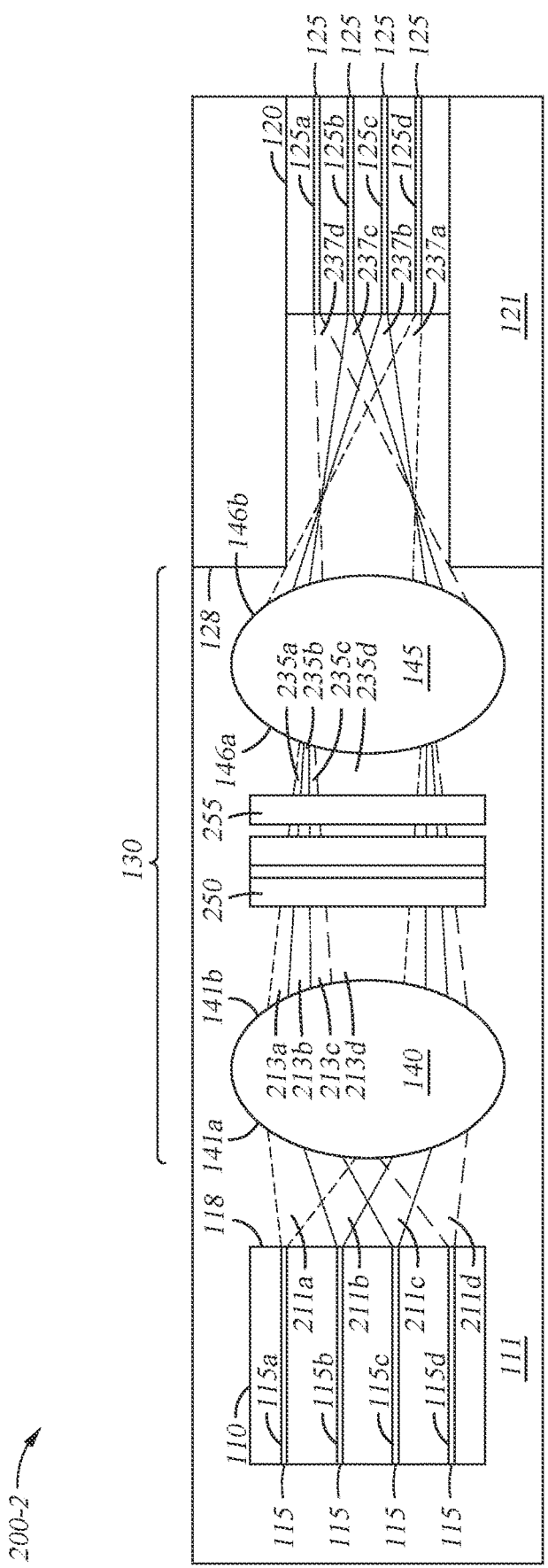
FIG. 2B illustrates an optical device with multiple power sensitive optical components, according to one or more embodiments.

FIG. 2B illustrates an optical device with multiple power sensitive optical components, according to one or more embodiments. As described above in FIG. 1, the optical component 150 may include a multiple free space optical components arranged along the distance 135 between the collimating lens 140 and the focusing lens 145. Arrangement 200-2 of the optical device 100 in FIG. 2B, includes an optical isolator 250, as described in FIG. 2A, positioned between the collimating lens 140 and the focusing lens 145 and a polarization controller device such as a liquid crystal polarization rotator 255. In some examples, the rotator 255 is also a power sensitive device placed between the collimating lens 140 and the focusing lens 145 in the collimated optical path, where the laser die 110 may transmit optical signals at a high power (e.g., greater than 100 mW), without exceeding power density limits of the rotator 255.

In some examples, the rotator 255, is a single stage retarder or a multiple stage retarder which provides for actively controlling the (SOP) of the optical signals 235a-235d and in turn the optical signals 237a-237d coupled into non-PM MCF 120 and channels 125a-125d. In some examples, a non-PM MCF between external laser source and a PIC is preferred from the standpoint of cost and optical performance. For example, the MCF 120 may be connected to provide the optical signals 237a-237d into a PIC (not shown in FIG. 2B). In some examples, the rotator 255 may be adjusted during operation of the optical device 100 in order to minimize interferences among optical components in the device or in external components (e.g., a PIC). For example, the rotator 255 may include a controller with a single control loop which adjusts the rotator 255 to reduce monitor photodiode (MPD) readings associated with lower powered components optically coupled to the optical device 100.

In some examples, the optical isolator 250 and the rotator 255 are dimensioned such that optical signals passing between the first collimating lens and the focusing lens also pass through the optical isolator 250 and rotator 255. For example, the signals 211a-211d pass through the collimating lens 140 which collimates the 211a-211d signals into respective collimated signals 213a-213d.

The collimated signals 213a-213d pass into the optical isolator 250 which prevents optical from the MCF 120 and the rotator 255 from interacting with the laser die 110. The collimated signals 213a-213d have large beam diameters with reduced optical power density. The collimated signals 213a-213d also pass through the rotator 255 to produce optical signals 235a-235d with controlled polarizations. The focusing lens 145 couples the optical signals 235a-235d into the channels 125a-125d of the MCF 120 as optical signals 237a-237d.

The examples in FIGS. 2A and 2B describe using the lens arrangement 130 to couple optical signals between a single die and a MCF in the optical device 100; however, the optical device 100 may include multiple light sources or laser dies, where the lens arrangement 130 provides for coupling from the multiple light sources into a single MCF as shown in FIGS. 3A and 3B.

FIGS. 3A and 3B illustrate optical devices with multiple multi-channel laser dies, according various embodiments. Arrangement 300-1 in FIG. 3A and arrangement 300-2 in FIG. 3B include a plurality of multi-channel laser dies including the laser die 110 and a multi-channel laser die 310 in an optical device 100 as shown in FIG. 1. The laser die 310 includes a plurality of optical channels such as multi-channels 315 which include channels similar to the channels 115a-115d described in FIG. 1. The multi-channels 315 generate and deliver optical signals 362-2 from a laser source in the laser die 310 to a facet end 318 (e.g., a front facet) of the laser die 310. The individual signals of the optical signals 362-2 delivered by the multi-channels 315 may have the same or differing wavelengths.

In the arrangements 300-1 and 300-2, the laser die 110 is positioned such that the facet end 118 is aligned or parallel to an axis 301. In the arrangement 300-1, the laser die 310 is positioned on the base structure 111 such that the facet end 318 is not aligned or parallel to the axis 301. In this example, optical signals 362-1 emitting from the multi-channels 115 and the optical signals 362-2 emitting from the multi-channels 315 interact with the lens arrangement 130 at different angles. In the arrangement 300-2, the laser die 310 is positioned on the base structure 111 such that the facet end 118 is aligned or substantially parallel to the axis 301. In this example, optical signals 362-1 emitting from the multi-channels 115 and the optical signals 362-2 emitting from the multi-channels 315 interact with the lens arrangement 130 at similar angles. The positioning of and components included in the lens arrangement 130 may include different configurations for the arrangements 300-1 and 300-2.

For example, in the arrangement 300-1 in FIG. 3A, the lens arrangement 130 is positioned between the laser die 110, the laser die 310, and the MCF 120 to couple the light generated at the laser die 110 and the laser die 310 to the MCF 120. The lens arrangement 130 includes a plurality of collimating lenses, including the collimating lens 140 and a collimating lens 340. The collimating lens 140 receives the optical signals 362-1 and collimates the optical signals as they pass through the lens (as described above in FIG. 1).

The collimating lens 340 is actively aligned to receive the optical signals 362-2 at a first side and collimate the optical signals 362-2 into collimated signals, similar to the collimated signals 164 described in relation to FIG. 1, as the optical signals 362-2 pass through the collimating lens 340. While described herein as a collimating lens, other embodiments may include any type of lens or optical component that provides direction to the optical signals 362-2 and provides the directed optical signals at a low or non-focused power density.

The collimated signals from the collimating lens 140 and the collimating lens 340 pass through free space optical components such as optical component 350-1. In some examples, the optical component 350-1 is beam combiner. For example, the optical component 350-1 may be a polarization multiplexing (PM) device where a plurality of optical signals passing between the collimating lens 140 and the focusing lens 145 and a plurality of optical signals passing between the collimating lens 340 and the focusing lens passes through the PM device. In some examples, the optical component 350-1 is a beam splitter or other similar device which receives collimated optical signals from the collimating lens 140 and the collimating lens 340 and provides direction for the signals to the focusing lens 145. For example, optical signals received from the collimating lens 340 may be turned or redirected to enable coupling of the signals into the MCF 120 as optical signals 368.

In some examples, the lens arrangement 130 includes additional optical components such as optical components 355-1, 355-2, and 355-3. The optical components 350-1, and 355-1-355-3 may include any combination of the free space optical devices described herein. In some examples, the additional optical components are positioned between the optical component 350-1 and the collimating lenses 140 and 340. For example, optical components 355-1 and 355-2 are optical isolators positioned between the collimating lens 140 and optical component 350-1 and the collimating lens 340 and optical component 350-1 respectively. The optical component 355-3 is positioned between the optical component 350-1 and the focusing lens 145. Each of the optical components 355-1 and 355-2 may provide optical functions to a subset of optical signals passing through the lens arrangement 130, such as the optical signals from one of the collimating lenses 140 and 340. The optical component 355-3 may provide optical functions to all of the optical signals passing through the lens arrangement 130.

In the arrangement 300-2 in FIG. 3B, the lens arrangement 130 is positioned between the laser die 110, the laser die 310, and the MCF 120 to couple the light generated at the laser die 110 and the laser die 310 to the MCF 120. In the arrangement 300-2, the laser die 310 is positioned on the base structure 111 such that the facet end 118 is aligned or substantially parallel to the axis 301. The lens arrangement 130 includes a plurality of collimating lenses, including the collimating lens 140 and a collimating lens 340. The collimating lens 140 receives the optical signals 362-1 and collimates the optical signals as they pass through the lens (as described above in FIG. 1).

The collimating lens 340 is actively aligned to receive the optical signals 362-2 at a first side and collimate the optical signals 362-2 into collimated signals, similar to the collimated signals 164 described in relation to FIG. 1, as the optical signals 362-2 pass through the collimating lens 340. While described herein as a collimating lens, other embodiments may include any type of lens or optical component that provides direction to the optical signals 362-2 and provides the directed optical signals at a low or non-focused power density.

The collimated signals from the collimating lens 140 and the collimating lens 340 pass through frees pace optical components such as optical component 350-2. In some examples, the optical component 350-2 is a wavelength multiplexing (WM) device where a plurality of optical signals passing between the collimating lens 140 and the focusing lens 145 and a plurality of optical signals passing between the collimating lens 340 and the focusing lens passes through the WM device. In some examples, the optical component 350-2 is a Z-block or other similar device which receives collimated optical signals from the collimating lens 140 and the collimating lens 340 and provides direction for the signals to the focusing lens 145. For example, optical signals received from the collimating lens 340 may be redirected to enable coupling of the signals into the MCF 120 as optical signals 368. A Z-block is shown in more detail in relation to FIGS. 4A and 4B.

In some examples, the lens arrangement 130 in FIG. 3B includes additional optical components such as the optical components 355-1, 355-2, and 355-3. The optical components 350-2, and 355-1-355-3 may include any combination of the free space optical devices described herein. In some examples, the additional optical components are positioned between the optical component 350-2 and the collimating lenses 140 and 340. For example, optical components 355-1 and 355-2 are optical isolators positioned between the collimating lens 140 and optical component 350-2 and the collimating lens 340 and optical component 350-2 respectively. The optical component 355-3 is positioned between the optical component 350-2 and the focusing lens 145. Each of the optical components 355-1 and 355-2 may provide optical functions to a subset of optical signals passing through the lens arrangement 130, such as the optical signals from one of the collimating lenses 140 and 340. The optical component 355-3 may provide optical functions to all of the optical signals passing through the lens arrangement 130.

In some examples, the lens arrangement 130 provides for coupling of optical signals into a various cores of the MCF 120 as shown in more detail in relation to FIGS. 4A and 4B, 5A and 5B, and 6A-6C.

Figure 4A:
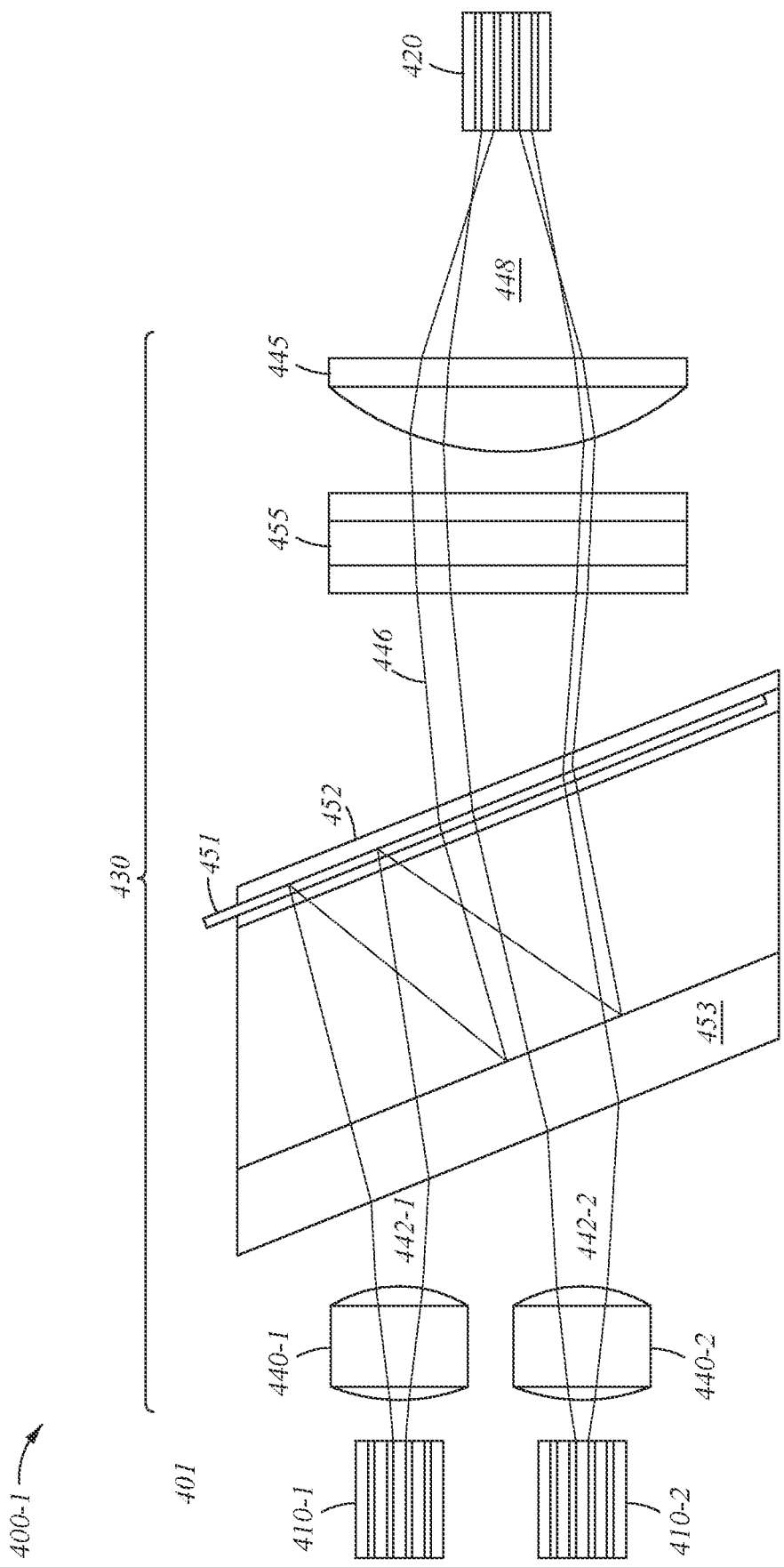
FIGS. 4A and 4B illustrate a lens arrangement with a Z-block, according to one or more embodiments.
Figure 4B:
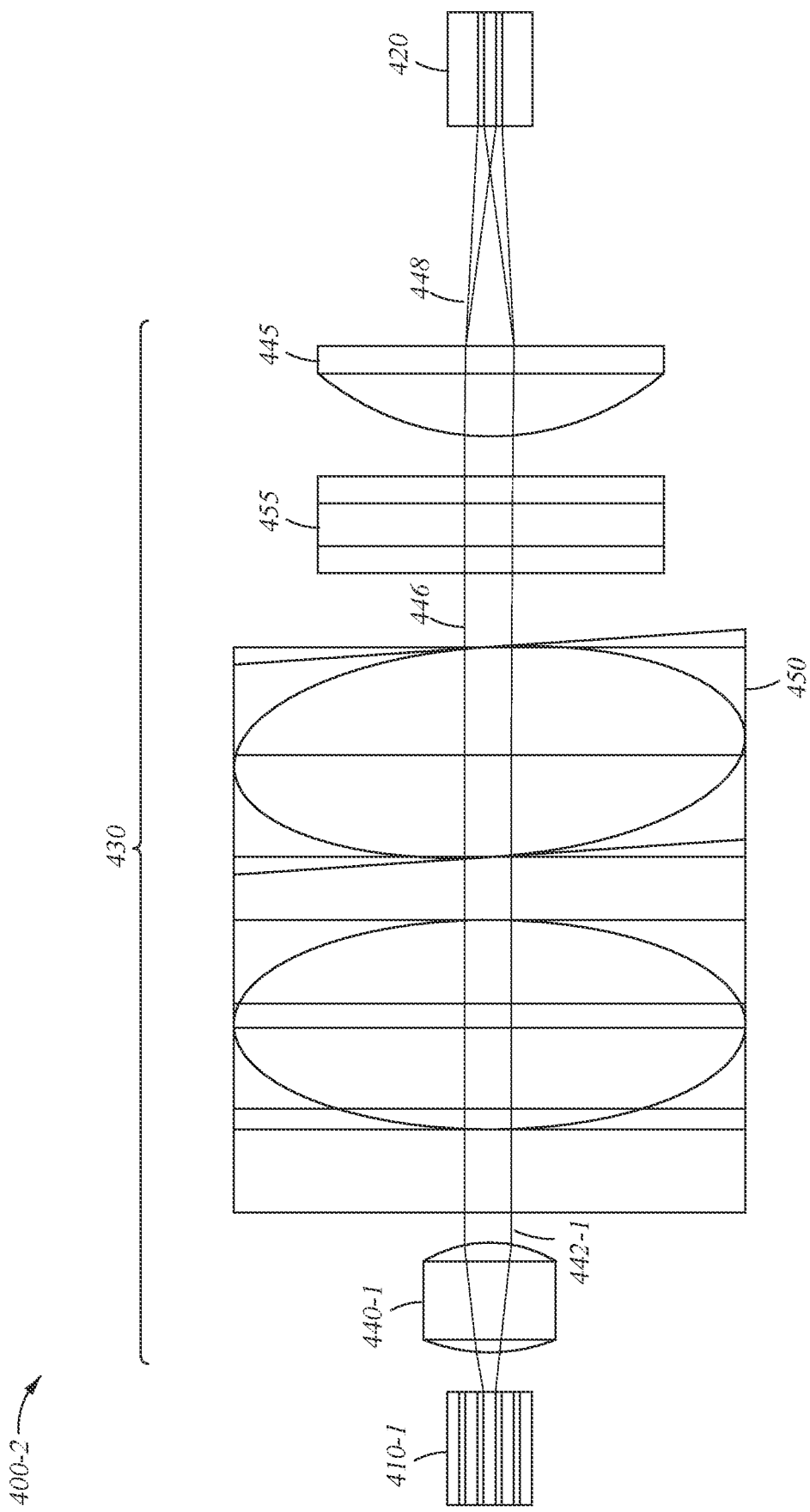

FIGS. 4A and 4B illustrate a lens arrangement with a Z-block, according to one or more embodiments. FIG. 4A is a top view 400-1 of the device 401 and FIG. 4B is a side view 400-2 of the device 401. The device 401 includes a plurality of multi-channel laser dies including laser dies 410-1 and 410-2. The laser dies 410-1 and 410-2 include a plurality of optical channels such as multi-channels similar to the channels 115a-115d described in FIG. 1. The device 401 also includes lens arrangement 430 including collimating lens 440-1 and 440-2 which produce collimated signals 442-1 and 442-2 from optical signals received from the laser dies 410-1 and 410-2.

The collimated signals 442-1 and 442-2 pass through free space optical components such as Z-block 450. Where the optical signals are aligned in a same plane. In some examples, the Z-block 450 includes an HR/AR coating layer 451 to provide an angle relative to the side wall of Z-block. In some examples, light from the collimating lens 440-1 reflects from an HR surface, causing the collimated light to shift downward in FIG. 4A. Light from the collimating lens 440-2 passes straight through AR surface and does not shift in the downward direction.

For example, the collimated signals 442-1 are reflected on layer 451 and components 452 and 453 of the Z-block to pass through a similar area of space as the collimated signals 442-2. The collimated signals 442-1 and 442-2 exit the Z-block 450 as grouped signals 446 to the focusing lens 445. In some examples, the grouped signals 446 also pass through an optical isolator 455 or other components in the lens arrangement 430. The focusing lens 445 couples signals 448 into cores of the MCF 420. In some examples, the MCF may include a 1D fiber or 2D fiber as shown in FIGS. 5A and 5B.

Figure 5A:
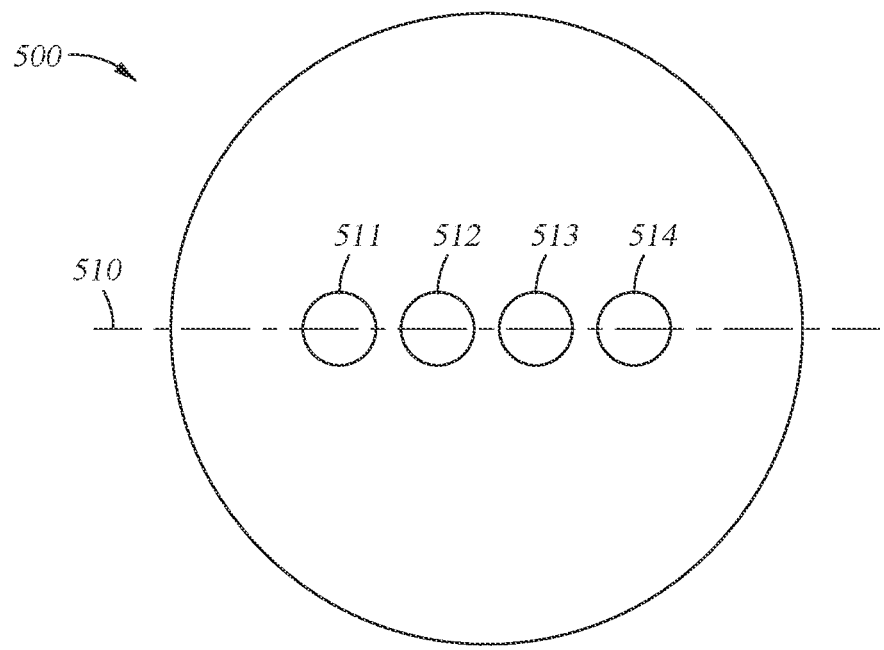
FIGS. 5A and 5B illustrate optical cores in an optical fiber, according to one or more embodiments.
Figure 5B:
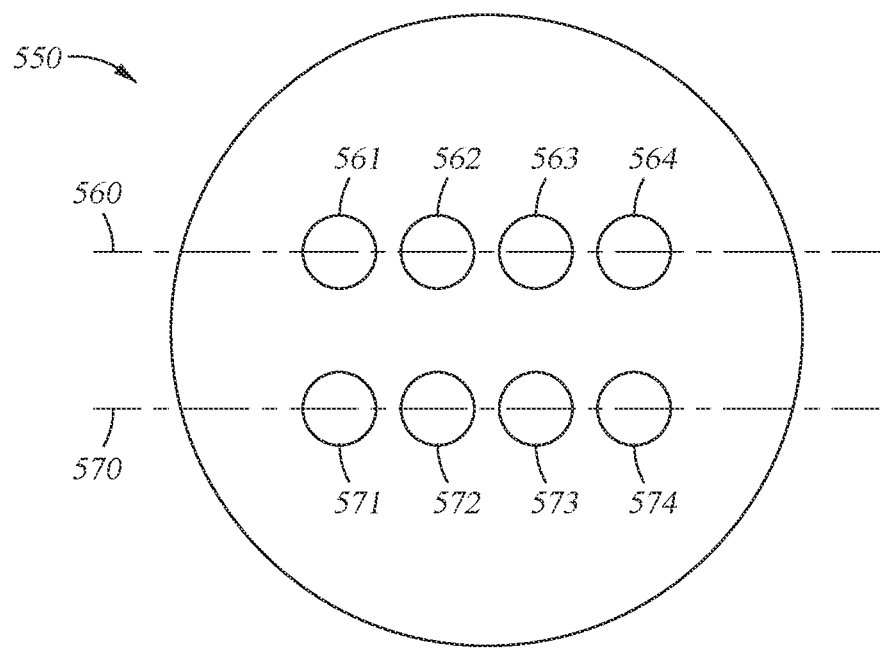
Figure 6A:
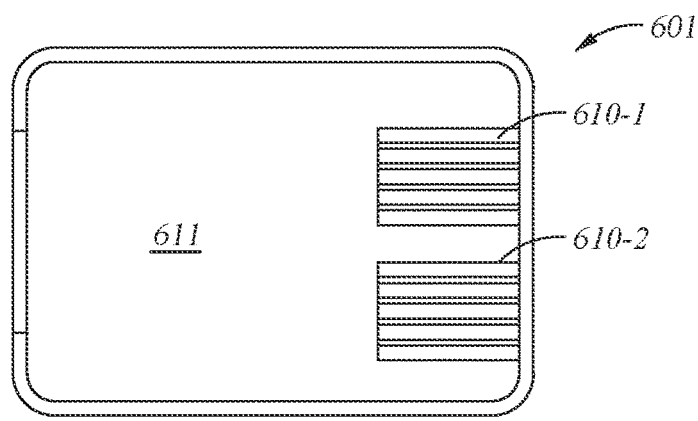
FIGS. 6A-6E illustrate an exemplary sequence of forming an optical device, according to one or more embodiments.
Figure 6B:
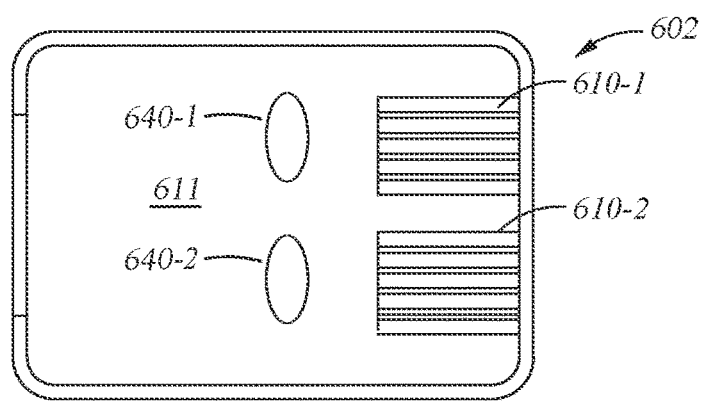
Figure 6C:
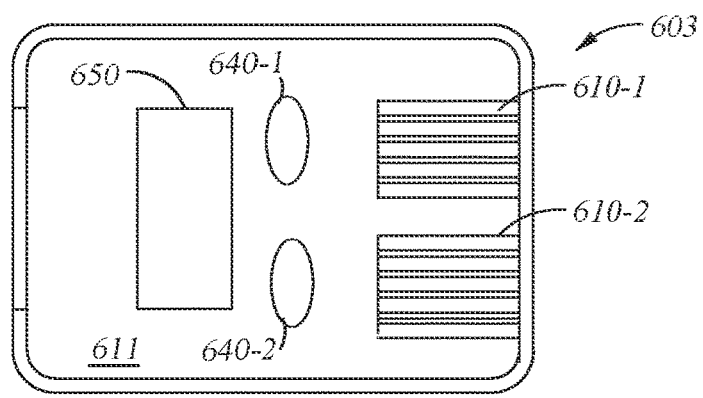
Figure 6D:
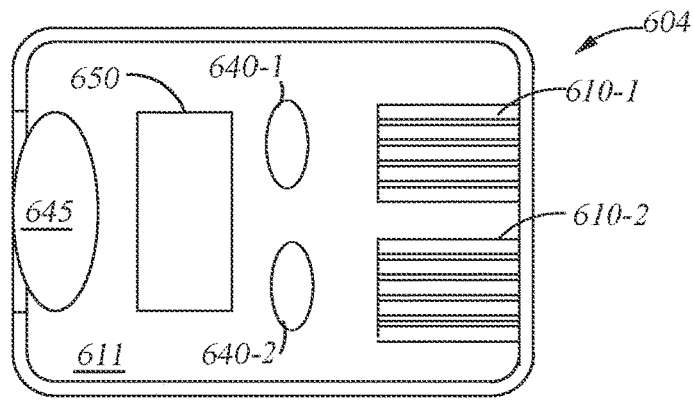
Figure 6E:
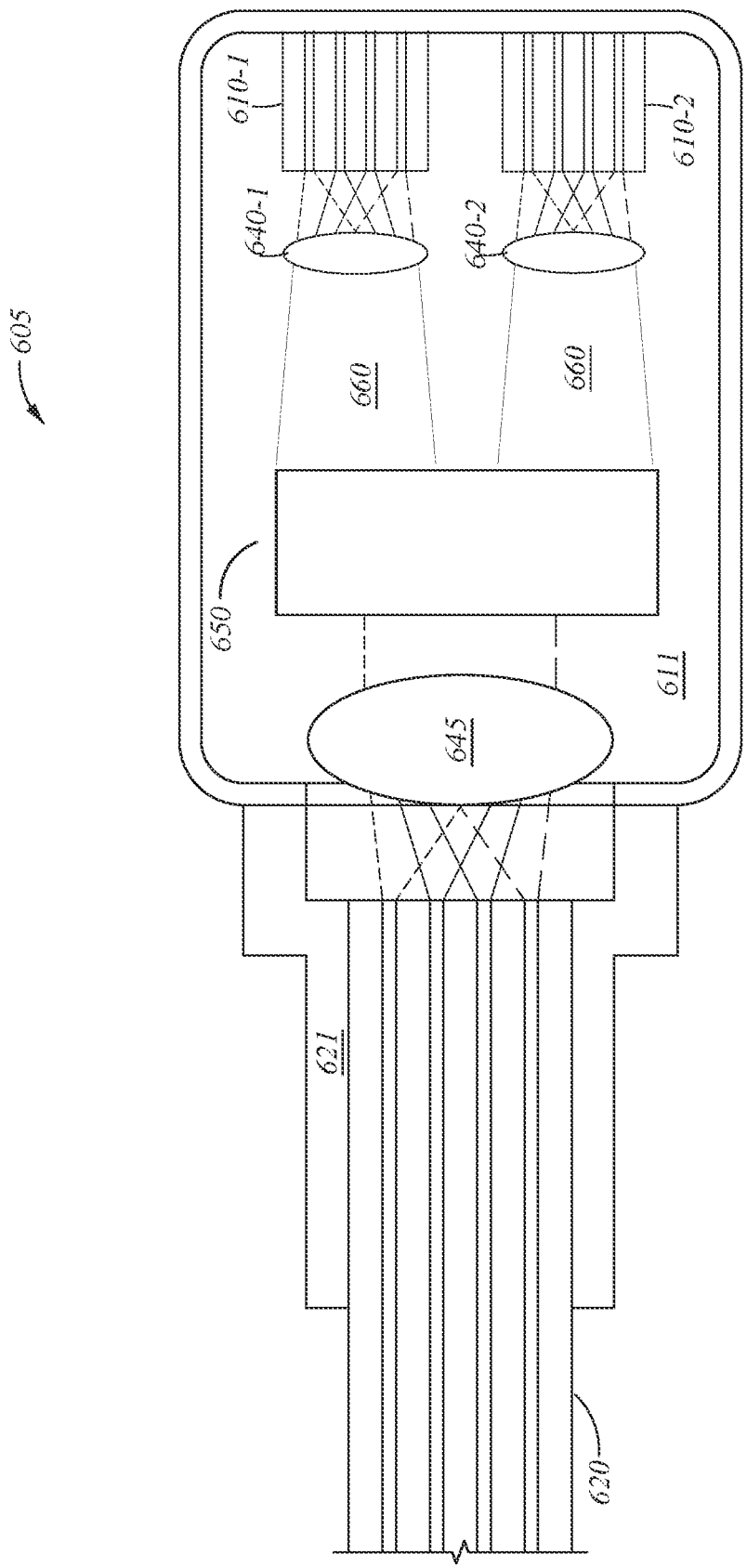

FIGS. 5A and 5B illustrate optical cores in an optical fiber, according to one or more embodiments. FIG. 5A illustrates a cross-section 500 of a 1D MCF, which includes fiber cores 511-514 arranged along one plane axis 510. FIG. 5B illustrates a cross-section 550 of a 2D MCF, which includes fiber cores 561-564 arranged along a first plane axis 560 and fiber cores 571-574 arranged along a second plane axis 570.

Returning back to FIGS. 4A-4B, the focusing lens 445 may couple the signals 448 into individual cores of either a 1D or 2D fiber. For example, signals may be coupled into fiber cores 511-514 or into any of fiber cores 561-564. In some examples, each optical signal received in the lens arrangement is coupled into an individual core. In another example, signals may be combined into one core. For example, a 1271 nm signal from the laser die 410-1 and a 1291 nm signal from the laser die 410-2 may be coupled into one core (e.g., the core 511) via wavelength multiplexing provided by the Z-block 450.

Figure 7:
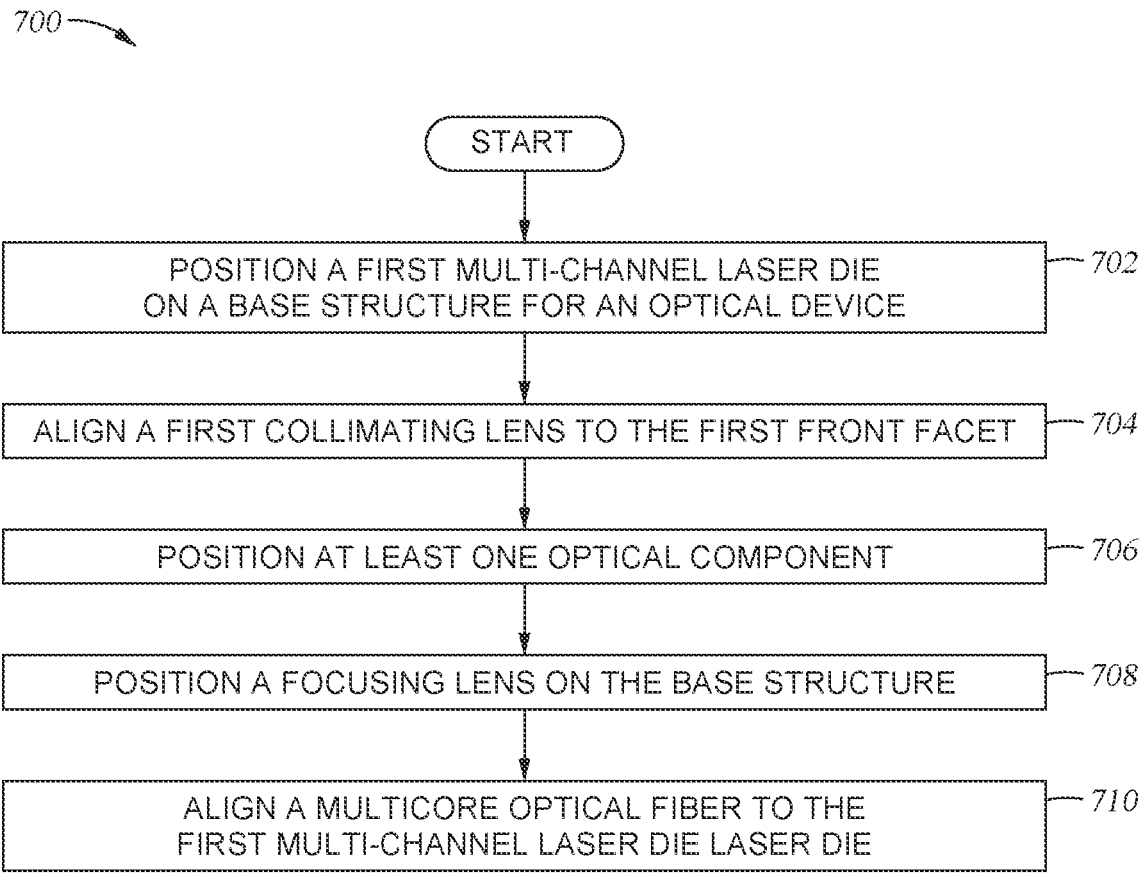
FIG. 7 is an exemplary method of forming an optical device, according to one or more embodiments.

FIGS. 6A-6E illustrate an exemplary sequence of forming an optical device and FIG. 7 is an exemplary method 700 of forming an optical device, according to one or more embodiments. The method 700 may be used in conjunction with other embodiments, to form the optical devices shown in any of FIGS. 1, 2A-2B, 3A-3B, and 4A-4B. In some examples, the method 700 is formed by an optical device fabricator using standard fabrication techniques and materials. For ease of discussion, reference will be made to FIGS. 6A-8E, during the discussion of method 700.

The method 700 begins at block 702, where the fabricator positions a first multi-channel laser die on a base structure for an optical device, where the first multi-channel laser die includes a first plurality of laser channels at a first front facet of the first multi-channel laser die. In some examples, the base structure 111 is a substrate be formed of any suitable material, such as silicon or ceramic. The fabricator may also position a second multi-channel laser die on the base structure, where the second multi-channel laser die includes a second plurality of laser channels at a second front facet of the first multi-channel laser die.

In some embodiments, positioning the multi-channel laser die includes epitaxially growing III-V material layers on the substrate. In other embodiments, the multi-channel laser die is attached to another substrate, and arranging the multi-channel laser die comprises attaching the substrates together (e.g., bonding, soldering). For example, as shown in diagram 601 of FIG. 6A, the fabricator positions a first multi-channel laser die 610-1 and a second multi-channel laser die 610-1 on a base structure 611.

At block 704, the fabricator aligns a first collimating lens to the first front facet, where a first side of the first collimating lens faces the first front facet. The fabricator may also align a second collimating lens to the second front facet, where a first side of the first collimating lens faces the first front facet and a second side of the first collimating lens faces the at least one optical component. In some examples, aligning the first side of a first collimating lens to the first front facet is an active alignment process. For example, as shown in diagram 602 of FIG. 6B, the fabricator aligns a first collimating lens 640-1 to a first front facet of the laser die 610-1, where a first side of the first collimating lens faces the first front facet. The fabricator may also align a second collimating lens 640-2 to a first front facet of the laser die 610-2.

At block 706, the fabricator positions at least one optical component on a second side of the first collimating lens opposite the first side of the first collimating lens. In some examples, the at least one optical component includes an optical isolator where a plurality of optical signals passing between the first collimating lens and the focusing lens passes through the optical isolator. In some examples, positioning the at least one optical component. For example, as shown in diagram 603 of FIG. 6C, the fabricator positions an optical component 650 on the base structure 611. In some examples, the optical component 650 is an optical component similar to the optical component 350-2 (e.g., a WDM device, polarization MUX, etc.). In other embodiments, such as configuration of the lens and dies not shown in FIG. 6B, the method 700 may also include aligning a tilt of the optical isolator within a tilt tolerance for coupling efficiency of the optical device.

In some examples, the at least one optical component is a polarization controller device positioned between the first collimating lens and the focusing lens. In some examples, the plurality of optical signals passing between the first collimating lens and the focusing lens passes through the polarization controller device. In this example, positioning the at least one optical component may include determining a state of polarization for plurality of optical signals passing into the multicore optical fiber and aligning the polarization controller device to control a polarization of the plurality of optical signals passing into the multicore optical fiber from the focusing lens.

In some examples, when multiple collimating lenses are positioned on the base structure as described in block 704, positioning the at least optical component further includes aligning the at least one optical component includes to receive collimated beams emitting from the first collimating lens and the second collimating lens.

At block 708, the fabricator positions a focusing lens on the base structure to place the at least one optical component between the first collimating lens and the focusing lens. For example, as shown in diagram 604 of FIG. 6D, the fabricator positions a focusing lens 645 on the base structure 611.

At block 710, the fabricator aligns a multicore optical fiber to the first multi-channel laser die laser die through to the first multi-channel laser die through the focusing lens, the at least one optical component, and the first collimating lens. In some examples, the multicore optical fiber is attached to an optical connector, and aligning the multicore optical fiber to the first multi-channel laser die includes attaching the optical connector to the base structure. For example, as shown in diagram 605 of FIG. 6E, the fabricator attached a MCF 620 including housing 621 to the base structure 611. In some examples, the fabricator aligns the multicore optical fiber to the second multi-channel laser die laser die through the focusing lens, the at least one optical component, and the second collimating lens such that optical signals 660 travel from the laser die 610-1 and the laser die 610-2 to the MCF 620.

In some examples, the MCF includes a first plurality of optical cores in a first plane. In another example, the MCF is a 2D MCF and includes a first plurality of optical cores in a first plane and a second plurality of optical cores in a second plane. In this example, the fabricator aligns the at least one optical component to receive collimated beams emitting from the first collimating lens and the second collimating lens by aligning the at least one optical component to couple a first optical signal with a first wavelength and transmitting from the first plurality of laser channels to a first optical core of the first plurality of optical cores via the at least one optical component and the focusing lens. The fabricator also aligning the at least one optical component to couple a second optical signal with a second wavelength and transmitting from the second plurality of laser channels to the first optical core of the first plurality of optical cores via the at least one optical component and the focusing lens.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical device comprising:
a first multi-channel laser die comprising a first plurality of laser channels at a first front facet of the first multi-channel laser die;
a lens arrangement comprising:
a first collimating lens aligned to the first front facet;
a focusing lens; and
at least one optical component positioned between the first collimating lens and the focusing lens; and
a multicore optical fiber aligned to the first multi-channel laser die through the lens arrangement and comprising a first plurality of optical cores, wherein the at least one optical component comprises:
a polarization controller device positioned between the first collimating lens and the focusing lens, wherein a plurality of optical signals passing between the first collimating lens and the focusing lens also pass through the polarization controller device, and wherein a plurality of optical signals coupled into the multicore optical fiber from the lens arrangement comprise controlled polarizations.

2. The optical device of claim 1, wherein the at least one optical component comprises an optical isolator wherein the plurality of optical signals passing between the first collimating lens and the focusing lens also pass through the optical isolator.

3. The optical device of claim 1, wherein the at least one optical component comprises a power sensitive optical component.

4. The optical device of claim 1, wherein the multicore optical fiber comprises a polarization-maintaining optical fiber (PMF).

5. An optical device comprising:
a first multi-channel laser die comprising a first plurality of laser channels at a first front facet of the first multi-channel laser die;
a second multi-channel laser die comprising a second plurality of laser channels at a second front facet of the second multi-channel laser die;
a lens arrangement comprising:
a first collimating lens aligned to the first front facet;
a second collimating lens aligned to the second front facet;
a focusing lens; and
at least one optical component positioned between the first collimating lens and the focusing lens; and
a multicore optical fiber aligned to the first multi-channel laser die through the lens arrangement and comprising a first plurality of optical cores.

6. The optical device of claim 5,
wherein the first plurality of optical cores are arranged in a first plane, and
wherein the multicore optical fiber comprises:
a second plurality of optical cores arranged in a second plane.

7. The optical device of claim 6, wherein
a first optical signal comprising a first wavelength and transmitting from the first plurality of laser channels is coupled to a first optical core of the first plurality of optical cores via the lens arrangement, and
a second optical signal comprising a second wavelength and transmitting from the second plurality of laser channels is coupled to the first optical core of the first plurality of optical cores via the lens arrangement.

8. The optical device of claim 5, wherein the at least one optical component comprises:
a wavelength multiplexing (WM) device wherein a plurality of optical signals passing between the first collimating lens and the focusing lens passes through the WM device, and wherein a plurality of optical signals passing between the second collimating lens and the focusing lens passes through the WM device.

9. The optical device of claim 5, wherein the at least one optical component comprises:
a polarization multiplexing (PM) device wherein a plurality of optical signals passing between the first collimating lens and the focusing lens passes through the PM device, and wherein a plurality of optical signals passing between the second collimating lens and the focusing lens passes through the PM device.

10. A method comprising:
positioning a first multi-channel laser die on a base structure for an optical device, where the first multi-channel laser die comprises a first plurality of laser channels at a first front facet of the first multi-channel laser die;
aligning a first collimating lens to the first front facet, where a first side of the first collimating lens faces the first front facet;
positioning at least one optical component on a second side of the first collimating lens opposite the first side of the first collimating lens;
positioning a focusing lens on the base structure to place the at least one optical component between the first collimating lens and the focusing lens; and
aligning a multicore optical fiber to the first multi-channel laser die through the first multi-channel laser die and through the focusing lens, the at least one optical component, and the first collimating lens, wherein the at least one optical component comprises:
a polarization controller device positioned between the first collimating lens and the focusing lens, wherein a plurality of optical signals passing between the first collimating lens and the focusing lens passes through the polarization controller device,
wherein positioning the at least one optical component further comprises:
determining a state of polarization for a plurality of optical signals passing into the multicore optical fiber; and
aligning the polarization controller device to control a polarization of the plurality of optical signals passing into the multicore optical fiber from the focusing lens.

11. The method of claim 10, wherein the at least one optical component comprises an optical isolator wherein a plurality of optical signals passing between the first collimating lens and the focusing lens passes through the optical isolator and wherein positioning the at least one optical component further comprises:
aligning a tilt of the optical isolator within a tilt tolerance for coupling efficiency of the optical device.

12. The method of claim 10,
wherein the multicore optical fiber is attached to an optical connector, and
wherein aligning the multicore optical fiber to the first multi-channel laser die comprises attaching the optical connector to the base structure.

13. The method of claim 10, wherein aligning the first side of the first collimating lens to the first front facet comprises an active alignment process.

14. The method of claim 10, further comprising:
positioning a second multi-channel laser die on the base structure, where the second multi-channel laser die comprises a second plurality of laser channels at a second front facet of the first multi-channel laser die; and
aligning a second collimating lens to the second front facet, where a first side of the second collimating lens faces the second front facet and a second side of the second collimating lens faces the at least one optical component;
wherein positioning the at least one optical component further comprises:
aligning the at least one optical component to receive collimated beams emitting from the first collimating lens and the second collimating lens; and
wherein the method further comprises:
aligning the multicore optical fiber to the second multi-channel laser die laser die through the focusing lens, the at least one optical component, and the second collimating lens.

15. The method of claim 14, wherein the multicore optical fiber comprises:
a first plurality of optical cores in a first plane, and
a second plurality of optical cores in a second plane.

16. The method of claim 15, wherein
aligning the at least one optical component to receive the collimated beams emitting from the first collimating lens and the second collimating lens further comprises:
aligning the at least one optical component to couple:
a first optical signal comprising a first wavelength and transmitting from the first plurality of laser channels to a first optical core of the first plurality of optical cores via the at least one optical component and the focusing lens, and a second optical signal comprising a second wavelength and transmitting from the second plurality of laser channels to the first optical core of the first plurality of optical cores via the at least one optical component and the focusing lens.

17. The method of claim 14, wherein the at least one optical component comprises at least one of:

a wavelength multiplexing (WM) device wherein the plurality of optical signals passing between the first collimating lens and the focusing lens passes through the WM device, and wherein a plurality of optical signals passing between the second collimating lens and the focusing lens passes through the WM device; and a polarization multiplexing (PM) device wherein the plurality of optical signals passing between the first collimating lens and the focusing lens passes through the PM device, and wherein the plurality of optical signals passing between the second collimating lens and the focusing lens passes through the PM device.

* * * * *